US006878361B2

(12) United States Patent
Clarke et al.

(10) Patent No.: US 6,878,361 B2
(45) Date of Patent: Apr. 12, 2005

(54) PRODUCTION OF STABLE AQUEOUS DISPERSIONS OF CARBON NANOTUBES

(75) Inventors: Mark S. F. Clarke, Seabrook, TX (US); Daniel L. Feeback, Houston, TX (US)

(73) Assignee: Battelle Memorial Institute, Columbus, OH (US)

(*) Notice: Subject to any disclaimer, the term of this patent is extended or adjusted under 35 U.S.C. 154(b) by 109 days.

(21) Appl. No.: 09/932,986

(22) Filed: Aug. 21, 2001

(65) Prior Publication Data

US 2003/0026754 A1 Feb. 6, 2003

Related U.S. Application Data

(60) Provisional application No. 60/303,816, filed on Jul. 10, 2001.

(51) Int. Cl.$^7$ .................................................. D01F 9/12
(52) U.S. Cl. .................. 423/461; 423/447.1; 423/447.2
(58) Field of Search ........................... 423/445.8, 447.1, 423/447.2, 461

(56) References Cited

U.S. PATENT DOCUMENTS

| | | | |
|---|---|---|---|
| 5,560,898 A | | 10/1996 | Uchida et al. |
| 5,853,877 A | * | 12/1998 | Shibuta ...................... 428/357 |
| 5,904,852 A | | 5/1999 | Tour et al. |
| 6,331,262 B1 | | 12/2001 | Haddon et al. |
| 6,350,488 B1 | | 2/2002 | Lee et al. |
| 6,368,569 B1 | | 4/2002 | Haddon et al. |
| 6,723,299 B1 | | 4/2004 | Chen et al. |
| 2002/0068170 A1 | | 6/2002 | Smalley et al. |
| 2002/0081380 A1 | | 6/2002 | Dillon et al. |
| 2002/0092613 A1 | | 7/2002 | Kuper |
| 2002/0102193 A1 | | 8/2002 | Smalley et al. |
| 2002/0102194 A1 | | 8/2002 | Smalley et al. |
| 2002/0113335 A1 | * | 8/2002 | Lobovsky et al. .......... 264/184 |
| 2002/0127171 A1 | | 9/2002 | Smalley et al. |
| 2002/0159944 A1 | | 10/2002 | Smalley et al. |
| 2002/0172767 A1 | | 11/2002 | Grigorian et al. |
| 2003/0004058 A1 | | 1/2003 | Li et al. |
| 2003/0031620 A1 | | 2/2003 | Harutyunyan et al. |
| 2003/0133865 A1 | * | 7/2003 | Smalley et al. .......... 423/447.1 |
| 2003/0170167 A1 | | 9/2003 | Nikolaev et al. |

FOREIGN PATENT DOCUMENTS

| | | |
|---|---|---|
| CN | 1335257 A | 2/2002 |
| EP | 0 949 199 A1 | 10/1999 |
| EP | 1 061 040 A1 | 12/2000 |
| EP | 1 092 680 A1 | 4/2001 |
| JP | 06228824 A | 8/1994 |
| JP | 08198611 A | 8/1996 |
| JP | 08231210 A | 9/1996 |
| JP | 08290908 A | 11/1996 |
| JP | 08325007 A | 12/1996 |
| JP | 09188509 A | 7/1997 |
| JP | 10120409 A | 5/1998 |
| KR | 2001-0049398 | 6/2001 |
| KR | 2001-0049453 | 6/2001 |
| KR | 2001-0049546 | 6/2001 |
| RU | 2 085 484 C1 | 7/1997 |
| RU | 2 086 503 C1 | 8/1997 |
| RU | 2 133 727 C1 | 7/1999 |
| WO | WO 00/61492 | 10/2000 |
| WO | WO 01/16023 A1 | 3/2001 |
| WO | WO 01/57284 A1 | 8/2001 |
| WO | WO 01/92381 A1 | 12/2001 |
| WO | WO 02/016257 A3 | 2/2002 |
| WO | WO 02/060813 A2 | 8/2002 |
| WO | WO 02/076888 A1 | 10/2002 |

OTHER PUBLICATIONS

Sigma Product Information Sheet for Triton X–100.*
Bonard et al. "Purification and Size Selection of Carbon Nanotubes", Advanced Materials vol. 9, No. 10, 1997, pp. 827–831.*
Chen et al. "Cyclodextrin–Mediated Soft Cutting of Single–Walled Carbon Nanotubes" Journal of the American Chemical Society vol. 123, Jun. 1, 2001, pp. 6201–6202.*
de Heer et al. "Aligned carbon nanotube films: Prodution and optical and electronic properties" Science vol. 268, May 12, 1995, p. 845.*
Krstic et al . . . , Langmuir–Blodgett Films of Matrix–Diluted Single–Walled Carbon Nanotubes. Chem. Mater., vol. 10, pp. 2338–2340, 1998.
A.C. Rinzler, et al.; "Large–scale purification of single–wall carbon nanotubes: process, product, and characterization" Applied Physics A 67, 117 (1998) pp. 29–37.
G.S. Duesberg, et al; "Rapid Communications; Chromatographic size separation of single–wall carbon nanotubes"; Applied Physics A; (1998) pp. 117–119.
Jie Liu et al.; "Fullerene Pipes"; Science vol. 280; (May 22, 1998); pp. 1253–1256.
Konstantin B. Shelimov, et al.; "Purification of single –wall carbon nanotubes by ultrasonically assisted filtration"; Chemical Physics Letters 282; (1998) pp. 429–434.
Kevin D. Ausman et al. Organic Solvent Dispersions of Single–Walled Carbon Nanotubes: Toward Solutions of pristine Nanotubes. Jul. 19, 2000 J. Phys. Chem. American Chemical Society.

* cited by examiner

Primary Examiner—Stuart L. Hendrickson
Assistant Examiner—Peter J Lish
(74) Attorney, Agent, or Firm—Law Offices of John Gibson Semmes

(57) ABSTRACT

Methods of producing stable dispersions of single-walled carbon nanotube structures in solutions are achieved utilizing dispersal agents. The dispersal agents are effective in substantially solubilizing and dispersing single-walled carbon nanotube structures in aqueous solutions by coating the structures and increasing the surface interaction between the structures and water. Exemplary agents suitable for dispersing nanotube structures in aqueous solutions include synthetic and natural detergents having high surfactant properties, deoxycholates, cyclodextrins, chaotropic salts and ion pairing agents. The dispersed nanotube structures may further be deposited on a suitable surface in isolated and individualized form to facilitate easy characterization and further processing of the structures.

13 Claims, 5 Drawing Sheets

PRODUCTION OF STABLE AQUEOUS DISPERSIONS OF CARBON NANOTUBES

CROSS-REFERENCE TO RELATED APPLICATIONS

This application claims priority from U.S. Provisional Patent Application Ser. No. 60/303,816, entitled "Isolation and Purification of Single Walled Carbon Nanotube Structures", and filed Jul. 10, 2001 The disclosure of the above-mentioned provisional application is incorporated herein by reference in its entirety.

GOVERNMENT INTERESTS

This invention was made with Government support under contract NCC9-41 awarded by the National Aeronautics and Space Administration. The Government has certain rights in the invention.

BACKGROUND OF THE INVENTION

1. Technical Field

The present invention relates to methods for isolating and purifying single-walled carbon nanotubes from contaminating materials, such as carbon and metal catalyst particles, present in the unpurified material following production of the single-walled carbon nanotube structures. Specifically, the present invention relates to utilizing solutions of suitable dispersal agents to isolate and purify individual single-walled carbon nanotube structures from a raw material including bundles of nanotube structures.

2. Description of the Related Art

There has been significant interest in the chemical and physical properties of carbon nanotube structures since their discovery in 1991, due to the vast number of potential uses of such structures, particularly in the field of nanotechnology, composite materials, electronics and biology. Accordingly, there has been an increase in demand in recent years for carbon nanotube structures for research and application purposes, resulting in a desire to produce in an efficient manner single-walled carbon nanotube (SWCNT) structures that are free of impurities and easily separable for their proper characterization.

The three most common manufacturing methods developed for the production of SWCNT structures are high pressure carbon monoxide (HipCO) processes, pulsed laser vaporization (PLV) processes and arc discharge (ARC) processes. Each of these processes produce SWCNT structures by depositing free carbon atoms onto a surface at high temperature and/or pressure in the presence of metal catalyst particles. The raw material formed by these processes includes SWCNT structures formed as bundles of tubes embedded in a matrix of contaminating material composed of amorphous carbon (i.e., graphene sheets of carbon atoms not forming SWCNT structures), metal catalyst particles, organic impurities and various fullerenes depending on the type of process utilized. The bundles of nanotubes that are formed by these manufacturing methods are extremely difficult to separate.

In order to fully characterize the physical and chemical properties of the SWCNT structures formed (e.g., nanotube length, chemical modification and surface adhesion), the contaminating matrix surrounding each structure must be removed and the bundles of tubes separated and dispersed such that each SWCNT structure may be individually analyzed. By maintaining an appropriate dispersal of individual SWCNT structures, characterization of the nanotubes formed may be accomplished in a mechanistic manner. For example, it is desirable to easily analyze and characterize dispersed SWCNT structures (e.g., determine change in nanotube length, tensile strength or incorporation of defined atoms into the carbon matrix of the SWCNT structure) based upon a modification to one or more elements of a manufacturing method.

It is further highly desirable to produce individual and discrete SWCNT structures in a form rendering the structures easily manipulable for use in the previously noted fields. At best, existing methodologies capable of physically manipulating discrete material components require elements that are measured on micron-level dimensions rather than the nanometer level dimensions of conventional partially dispersed and purified SWCNT structures. However, biological systems routinely manipulate with precise spatial orientation discrete elements (e.g., proteins) having physical dimensions on the order less than SWCNT structures. Thus, if SWCNT structures could be biologically derived so that biological "tools", such as immunoglobulins or epitope-specific binding proteins, could be utilized to specifically recognize and physically manipulate the structures, the possibility of accurately spatially orienting of SWCNT structures becomes feasible. In order for this approach to be realized, the SWCNT structures must be individually separated from the raw material in a manner consistent with the optimal functioning of biological compounds during both the biological SWCNT derivitization and the manipulation processes. In other words, the SWCNT structures must be produced as individual, freely dispersed structures in an aqueous buffer system that exhibits a nearly neutral pH at ambient temperatures in order to effectively manipulate the structures.

Current methods for purifying and isolating SWCNT structures by removing the contaminating matrix surrounding the tubes employ a variety of physical and chemical treatments. These treatments include high temperature acid reflux of raw material in an attempt to chemically degrade contaminating metal catalyst particles and amorphous carbon, the use of magnetic separation techniques to remove metal particles, the use of differential centrifugation for separating the SWCNT structures from the contaminating material, the use of physical sizing meshes (i.e., size exclusion columns) to remove contaminating material from the SWCNT structures and physical disruption of the raw material utilizing sonication. Additionally, techniques have been developed to partially disperse SWCNT structures in organic solvents in an attempt to purify and isolate the structures.

All of the currently available methods are limited for a number of reasons. Initially, it is noted that current purification methods provide a poor yield of purified SWCNT structures from raw material. A final SWCNT product obtained from any of these methods will also typically contain significant amounts of contaminating matrix material, with the purified SWCNT structures obtained existing as ropes or bundles of nanotubes thereby making it difficult to analyze and characterize the final SWCNT structures that are obtained. These methods further typically yield purified SWCNT structures of relatively short lengths (e.g., 150–250 nm) due to the prolonged chemical or physical processing required which causes damage to the nanotubes. Additionally, a number of isolation techniques currently utilized require organic solvents or other noxious compounds which create environmental conditions unsuitable for biological derivitization of SWCNT structures. Organic solvents currently utilized are capable of solubilizing SWCNT structures in bundles and not individual, discrete tubes. Furthermore, present isolation techniques require prolonged periods of ultra-speed centrifugation (i.e., above 100,000×g) in order to harvest nanotube structures from solvents or other noxious compounds used to remove contaminating matrix material from the nanotubes.

Presently, the overwhelming problem for industrial and academic laboratories engaged in the use of carbon nanotubes for research as well as other applications is the limited source of discrete, completely separated SWCNT structures. Investigations into the vast potential of uses for SWCNT structures are being hampered by the limited supply of well characterized SWCNT material free of significant amounts of contaminants like amorphous carbon and metal catalyst particles.

Accordingly, there presently exists a need for harvesting high yields of purified SWCNT structures from the raw material of a carbon nanotube production process in a fast and efficient manner to meet the demand for such structures. Additionally, it is desirable to provide SWCNT structures as discrete and individual structures (i.e., not bundled together), having suitable lengths and well characterized for biological derivitization and easy manipulation.

SUMMARY OF THE INVENTION

Therefore, in light of the above, and for other reasons that will become apparent when the invention is fully described, an object of the present invention is to provide a rapid and effective method of isolating and purifying SWCNT structures disposed within a raw material containing contaminants to obtain a high product yield of quality SWCNT structures having appropriate lengths suitable for different applications.

Another object of the present invention is to provide a method of dispersing isolated and purified SWCNT structures in solution from the raw material so as to yield discrete and separated nanotube structures suitable for different applications.

A further object of the present invention is to provide a method of dispersing isolated and purified SWCNT structures in a suitable solution to render the structures suitable for biological derivitization procedures to effect easy manipulation of the SWCNT structures.

A further object of the present invention is to produce an aqueous dispersion of single, discrete SWCNT's that remains stable over a prolonged period of time (i.e. weeks to months), a dispersion in which aggregation or "flocking" of SWCNT's does not occur.

The aforesaid objects are achieved in the present invention, alone and in combination, by providing a method of dispersing a matrix of raw material including SWCNT structures and contaminants in an aqueous solution containing a suitable dispersal agent to separate the individual SWCNT structures from the matrix, thus purifying and dispersing the structures within the solution. In solution, the dispersal agent surrounds and coats the individual SWCNT structures, allowing the structures to maintain their separation rather than bundling together upon separation of the structures from solution. Suitable dispersal agents useful in practicing the present invention are typically reagents exhibiting the ability to interact with hydrophobic compounds while conferring water solubility. Exemplary dispersal agents that can be used in the present invention include synthetic and natural detergents, deoxycholates, cyclodextrins, poloxamers, sapogenin glycosides, chaotropic salts and ion pairing agents.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

Figure 1A:
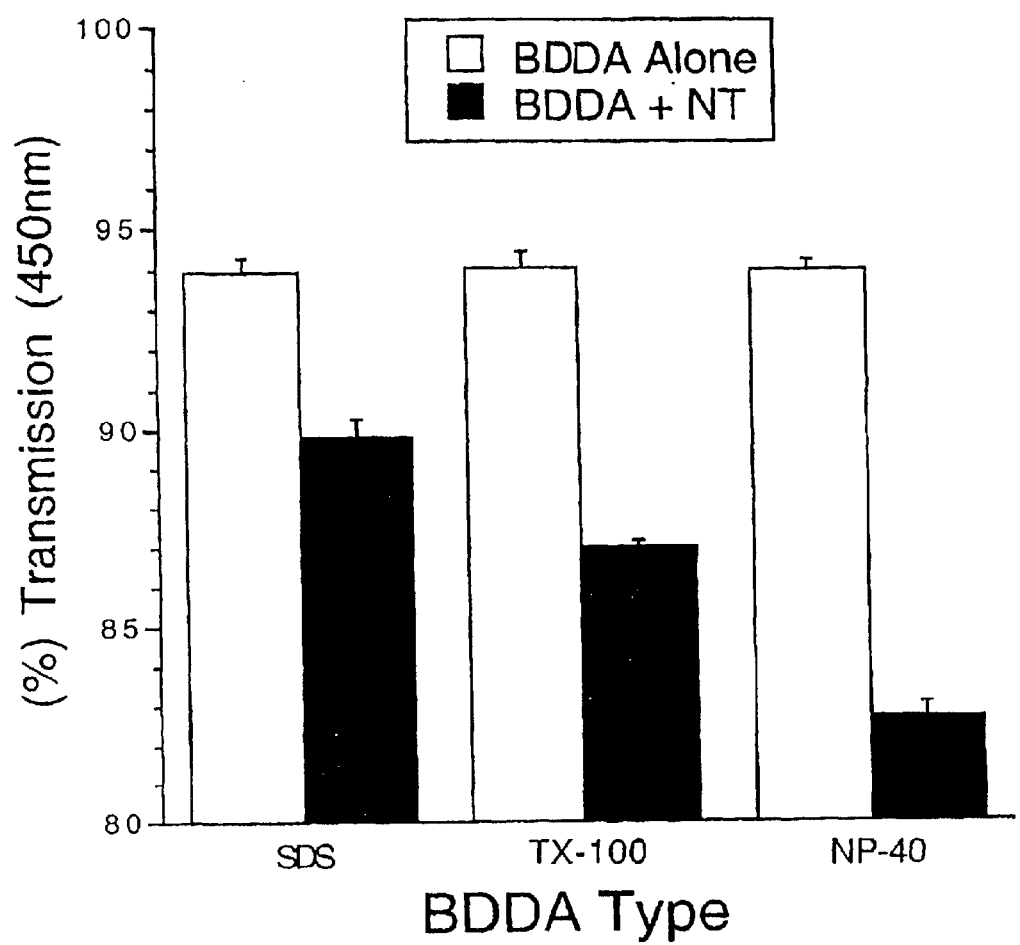
FIG. 1a is plot of % transmission (% T) values for aqueous solutions containing three synthetic detergents having varying surfactant strengths.

The present invention relates to a method for purifying and isolating SWCNT structures from raw material by dispersing the structures in an aqueous solution with a biologically active dispersal agent. The biologically active dispersal agent effects a separation of the SWCNT structures from contaminating material such that the purified SWCNT structures exist as a dispersion of individual and discrete SWCNT structures in solution. As used herein, the term "raw material" refers to material formed by any process for producing single-walled carbon nanotubes, including, without limitation, the three processes described above. The raw material typically contains SWCNT structures embedded in a matrix of contaminating material. The terms "contaminating material" and "contaminants", as used herein, refer to any impurities or other non-SWCNT components in the raw material including, without limitation, amorphous carbon and metal catalyst particles.

As previously noted, the current methods employed for purifying and harvesting SWCNT structures have met with limited success due in part to the traditional view of SWCNT structures as chemical compounds. In a departure from the traditional view, SWCNT structures are considered here as being similar to biologically derived structures. Some noted properties of SWCNT structures are as follows (not all of which must be present): they are typically insoluble in water; they typically self associate as bundles or ropes; they are made exclusively of carbon; and each end of a carbon nanotube will typically exhibit different physiochemical properties. The physical properties of carbon nanotubes are in fact very similar to lipids, which are a class of biological compounds insoluble in water but capable of being solubilized in aqueous solutions including suitable lipid dispersing reagents. As such, the inventors recognized that SWCNT structures are readily dispersable within an aqueous solution containing a reagent typically suitable for dispersing proteins or lipids in aqueous solutions.

Reagents considered effective in suitably dispersing SWCNT structures in aqueous solution are referred to as dispersal agents. A dispersal agent can be any suitable reagent that is effective in substantially solubilizing and dispersing SWCNT structures in an aqueous solution by increasing the interaction at the surface interface between each nanotube structure and water molecules in solution. The underlying mechanisms whereby a dispersal agent brings about dispersion of individual SWCNT structures, from the "bundles" or "ropes" in which they are constitutively formed, into an aqueous solution is primarily based upon the ability of the dispersal agent to break down the molecular forces at the surface of the SWCNT preventing water molecules from interacting with the SWCNT surface. In addition to this property, due to the large surface area of the SWCNT, it also essential that the dispersal agent have a molecular structure that maximizes its ability to reduce hydrophobic interactions between individual SWCNT's, while also being of a small enough size to easily penetrate into the inter-SWCNT spaces. A further requirement of an efficient SWCNT dispersal agent is that it also can remain in aqueous solution at a high enough concentration so that a useful dispersal agent concentration is maintained for SWCNT "bundle" or "rope" dispersal, even after a portion of the original amount in solution has been utilized for the dispersion of non-SWCNT contaminants in the raw nanotube material. The dispersal agent is typically added to an aqueous solution in an effective amount to substantially purify and disperse SWCNT structures in solution. The effective amount of dispersal agent will vary based upon the type of dispersal agent utilized in a particular application.

The dispersal agents are typically synthetic or naturally occurring detergents or any other composition capable of encapsulating and suitably solubilizing hydrophobic compounds in aqueous solutions. Exemplary dispersal agents include, without limitation, synthetic or naturally occurring detergents having high surfactant activities such as octyl-phenoxypolyethoxyethanol (commonly referred to as Nonidet P-40 or (NP-40), polyoxyethylene sorbitol esters (e.g., TWEEN® and EMASOL™ series detergents), poloxamers (e.g., the Pluronic™ series of detergents and Poloxamer 188, which is defined as $HO(C_2H_4O)_a(C_3H_6O)_b(C_2H_4O)_aH$, with the ratio of a to b being 80 to 27 and the molecular weight being in the range of 7680 to 9510) and ammonium bromides and chlorides (e.g., cetyltrimethylammonium bromide, tetradecylammonium bromide and dodecylpyrimidinium chloride), naturally occurring emulsifying agents such as deoxycholates and deoxycholate-type detergents (e.g., taurocholic acid), sapogenin glycosides (e.g., saponin) and cyclodextrins (e.g., $\alpha$-, $\beta$- or $\gamma$-cyclodextrin), chactropic salts such as urea and guanidine, and ion pairing agents such as sulfonic acids (e.g., 1-heptane-sulfonic acid and 1-octane-sulfoflic acid).

Naturally occurring emulsifying agents such as taurocholic acid and cyclodextrins are highly effective in solubilizing and dispersing SWCNT structures and in facilitating biological derivitization of the purified and isolated SWCNT structures. In particular, cyclodextrins have a three dimensional doughnut shaped orientation with a "torsional" structure composed of glucopyranose units. The "torsional" structure of a cyclodextrin molecule allows it to attract and interact with the surface of a SWCNT structure within its central hydrophobic region, even when physically altered from a round "doughnut" shape to a twisted "doughnut" shape, while maintaining an outer hydrophilic surface rendering the molecule soluble in aqueous solutions. The solubility of native cyclodextrins in water may also be increased nearly tenfold by substitution of, e.g., methyl or hydroxypropyl groups on the cyclodextrin molecule. Greater solubility of the cyclodextrin in water translates to a greater dispersion and isolation of individual SWCNT structures in solution. Two exemplary cyclodextrin derivatives that are highly effective in dispersing SWCNT structures in solution are methyl-$\beta$-cyclodextrin (M$\beta$C) and 2-hydroxypropyl-$\beta$-cyclodextrin (2-HP-$\beta$-C). However, it is noted that any cyclodextrin (i.e., $\alpha$, $\beta$ or $\gamma$), or any suitable derivative thereof, may be utilized in accordance with the present invention. Further, cyclodextrins are useful for biological derivitization of SWCNT structures which have been isolated in solution. Taurocholic acid (TA), which is exemplary of a suitable deoxycholate-type detergent capable of substantially dispersing SWCNT structures in solution, is produced naturally in mammalian liver tissue. It is also highly effective in facilitating biological derivitization of purified and isolated SWCNT structures because, like the cyclodextrins, TA has a molecular shape that allows a large surface area of SWCNT structures to be coated per molecule of TA. Typically, cyclodextrins and deoxycholates may be utilized to suitably disperse SWCNT structures according to the present invention in concentrations ranging from about 5 mg/ml to about 500 mg/ml of aqueous solution, with a preferable concentration of about 50 mg/ml.

Sapogenin glycosides (e.g. saponin), another naturally occurring class of emulsifying agent of plant origin, are also capable of dispersing SWCNT structures. Like both the cyclodextrins and deoxycholate type detergents, these compounds are amphiphilic in nature, have a high solubility in water and can act as protective colloids to normally water insoluble hydrophobic compounds (i.e., a SWCNT structure) in an aqueous solution. Solubilization of raw SWCNT material has been achieved at concentrations between 0.1 mg/ml up to 50 mg/ml of aqueous solution in the present invention, with a preferable concentration of about 10 mg/ml.

Synthetic detergents suitable for use as dispersal agents here will typically have a high surfactant activity and be utilized in amounts of about 50–95% of their critical micelle concentration (CMC) values. These high surfactant detergents are capable of overcoming hydrophobic forces at the SWCNT surface/aqueous solution interface by coating the SWCNT structures to establish suitable solubility of the SWCNT structures in solution. The surfactant properties of a synthetic detergent may be characterized in terms of a hydrophilic-lipophilic balance (HLB), which provides a measurement of the amount of hydrophilic groups to hydrophobic groups present in a detergent molecule. In particular, synthetic detergents that are suitable for use as dispersal agents here have an HLB value between about 7 and about 13.2. Limiting the concentration of the synthetic detergent to a suitable level below its CMC will also ensure adequate dispersion of the SWCNT structures without the formation of floccular material due to self-association of the detergent molecules. Additionally, chaotropic salts (e.g., urea and guanidine) are typically utilized as dispersal agents in concentrations ranging from about 6M to about 9M in solution (wherein "M" refers to molarity), whereas ion pairing agents are typically utilized as dispersal agents in concentrations ranging from about 1 mM to about 100 mM in solution.

While selection of a suitable dispersal agent as well as a suitable concentration is important for achieving a desirable dispersion of SWCNT structures in aqueous solution, other factors may also enhance the dispersing effect of the dispersal agent. Exemplary factors that affect dispersion of SWCNT structures in aqueous solutions include, without limitation, the pH of the solution, cation concentration (e.g., sodium, potassium and magnesium) in solution, and other conditions such as operating temperature and pressure. Indeed, due to the unique properties of the solvent in this case, namely water, specifically the unique chemical interactions that can exist between individual water molecules (i.e. hydrogen bonding, molecular aggregation) it is predicted that decreasing the operating temperature (rather than increasing the temperature as is the case in most common chemical reactions) will increase the ability of a dispersal agent to disperse SWCNT material due to a reduction in hydrophobic interactions between the SWCNT surface and the water molecules at lower operating temperatures (i.e. between 0° C. and 10° C.). By interacting with the surface of individual SWCNT structures, the dispersal agent molecules typically surround and coat the exposed hydrophobic surface of the SWCNT. This interaction results in the separation of individual SWCNT structures from the bundles in which they were formed and from contaminating matrix material, and due to the amphiphilic nature of the dispersal agent maintains the now discretely separated, individual SWCNT structures in the form of an aqueous dispersion or colloidal solution.

The raw material containing SWCNT structures typically is added to an aqueous solution containing the dispersal agent and appropriately mixed (e.g., by mechanical agitation or blending) to ensure adequate interaction and coating of dispersal agent molecules with SWCNT structures. While the amount of SWCNT material that may be added to an aqueous dispersal agent solution to obtain an effective dispersion of SWCNT structures typically depends upon factors such as the specific dispersal agent utilized and its concentration in solution, effective dispersions have been achieved utilizing concentrations as high as 1 mg/ml of SWCNT structures in aqueous dispersal agent solution. Upon adequate mixing, the solution containing the dispersed SWCNT structures may be filtered with an appropriately sized filter (e.g., about 0.05–0.2 $\mu$m filtration) to remove any insoluble material (e.g., matrix contaminants) remaining in solution. Typically, a 0.2 $\mu$m filter is utilized to ensure adequate removal of contaminants while preventing caking of the filter and loss of dispersed SWCNT structures. However, smaller pore size filters may also be utilized to ensure more efficient removal of contaminants. In situations where a smaller pore size filter is implemented, any SWCNT structures that may have become trapped in the filter cake may be recovered by resuspension of the cake in dispersal agent solution and repeating filtration steps as necessary to obtain a desirable yield. Alternatively, a standard cross-flow filtration system can be utilized to reduce the amount of caking that occurs on the surface of the filter.

Additional processing steps, such as centrifugation or other separation techniques, may also be utilized to remove insoluble material and excess dispersal agent from solution after the SWCNT structures have been suitably dispersed therein. Specifically, the SWCNT structures may be washed to remove excess dispersal agent by subjecting the solution to centrifugation at speeds ranging from about 100×g to about 10,000×g to sediment SWCNT structures. The SWCNT structures may then be removed from solution and re-dispersed in distilled water. The washing process may be repeated any desired number of times to ensure adequate removal of excess dispersal agent. The SWCNT structures may also be separated from excess dispersal agent and other contaminants in solution via dialysis or the use of an appropriate size exclusion column (e.g., a 5000 MW size exclusion column). The resultant solution, which contains substantially isolated and purified SWCNT structures coated with dispersal agent, is highly useful in a variety of applications, particularly nanotechnology research. As for example in the case of protein biochemistry, where protein function may be negatively impacted by the use of a particular dispersal agent as a prerequisite to enable the extraction of the protein from contaminating matrix, once dispersal of the protein into an aqueous solution has been achieved, the offending dispersal agent can be substituted with a second dispersal agent. This second dispersal agent also maintains the protein molecule in aqueous solution but is more appropriate for those applications where protein function is paramount. In a similar fashion, once dispersal of SWCNT material has been achieved, if necessary the primary dispersal agent can be substituted with a second dispersal agent that is more suitable for the envisioned use. For example, a cyclodextrin can be used as the primary dispersal agent to produce a stable dispersion of individual SWCNT's in an aqueous solution. The cyclodextrin dispersal agent can then be substituted with, for example, a secondary dispersal agent such as Poloxamer 188. The secondary dispersal agent provides a matrix material that coats the surface of individual SWCNT's that is easily polymerized to form, for example, an SWCNT-containing composite material, or a readily accessible source of chemical groups now associated with the surface of the dispersed SWCNT's that can be easily modified using standard chemistries.

One central aim of the present invention is to ensure that SWCNT's are dispersed in an aqueous solution in the form of individual, discrete nanotubes (i.e., a complete dispersion). One characteristic of SWCNT material dispersed in an aqueous solution that contains SWCNT's, that remain either in non-dispersed bundles or that have been individually separated but have re-associated into bundles (i.e., an incomplete dispersion), is that the SWCNT material re-associates into large aggregates or "flocs" which in turn sediment out of solution. This process occurs within a matter of minutes to hours, even after filtering the dispersion through a 0.2 micron filter. In the case of a complete dispersion, filtering the solution through a 0.2 micron filter results in a colored liquid that essentially does not flock or aggregate over time and remains stable (i.e., no flocking) for extended periods of time. As long as the relative concentration of the dispersed SWCNT's or dispersal agent in the aqueous solution is not increased by evaporation of water the dispersion remains stable (i.e., SWCNT's remain as single discrete nanotubes in the aqueous solution).

The maximum concentration of SWCNT material that can be maintained in solution by a particular dispersal agent is related to the total surface area of the individual SWCNT's present in the solution. A complete aqueous dispersion of SWCNT material exists where there is a balance between the amount of SWCNT surface area exposed to the solvent (i.e., water) and the amount of dispersal agent available to interact with that exposed SWCNT surface in order to confer water solubility on the SWCNT. The amount of dispersal agent available to interact with the exposed SWCNT surface in aqueous solution is in turn dependent on the water solubility of the particular dispersal agent and the amount of SWCNT surface area that each individual dispersal agent molecule is capable of interacting with. As such, there is a maximal amount of SWCNT material that can be completely dispersed at a particular concentration of a particular dispersal agent. The maximal amount of SWCNT material that can be dispersed using a particular dispersal agent is achieved at or below the concentration of dispersal agent in aqueous solution where self-association of the dispersal agent occurs (known as the CMC in the case of detergents and Cloud Point in the case of emulsifying agents). In addition, the amount of SWCNT material that can be dispersed in such a dispersal agent solution cannot however exceed the saturation concentration of individual, discrete SWCNT's in solution, which due to their large physical size exhibit colloidal properties. This maximum SWCNT concentration is in turn dependent on the length of the SWCNT (i.e., its molecular size), the longer the SWCNT the lower the maximal concentration that can be maintained as a complete dispersion in an aqueous solution at a constant dispersal agent concentration. Based on this understanding, for a particular dispersal agent dissolved at its optimal concentration in water, there is also a maximum concentration (i.e., number) of SWCNT's that can be maintained as a complete aqueous dispersion, where that maximum number is directly related to the surface area of the SWCNT's in solution.

For example, a SWCNT of 100 nm in length and 1 nm in diameter has an exposed external surface area of $100\pi$ nm$^2$. A SWCNT of 10,000 nm (e.g. 10 microns) in length and 1 nm in diameter has an exposed external surface area of $10,000\pi$ nm$^2$. As such, it requires the same amount of dispersal agent to maintain one hundred, 100 nm long SWCNT's as a complete dispersion as it does to keep a single 10 micron SWCNT in complete dispersion. This example demonstrates the importance of the relationship between (1) molecular shape of the dispersal agent (i.e., the amount of SWCNT surface area that a single molecule of dispersal agent can interact with), (2) concentration of the dispersal agent in solution, (3) overall exposed SWCNT surface area (related to SWCNT length) and (4) the maximal amount of SWCNT material that can exist as a complete aqueous dispersion.

The following examples disclose specific methods for isolating and purifying SWCNT structures from raw material containing contaminants. Specifically, NP-40, TA, Poloxamer 188, saponin and a cyclodextrin derivative are utilized to show the effect of each in dispersing SWCNT structures in aqueous solution. The raw material containing SWCNT structures for each example was obtained utilizing a PLV process. However, it is noted that the SWCNT structures may be isolated and purified utilizing raw material provided via any process. It is further noted that the examples are for illustrative purposes only and in no way limit the methods and range of dispersal agents contemplated by the present invention.

EXAMPLE 1

Raw material containing bundled SWCNT structures was mixed into three synthetic detergent solutions known for solubilizing proteins and lipids in aqueous solutions. The three synthetic detergents utilized were NP-40, SDS and TX-100. These detergents were selected due to their differing physical properties and to demonstrate how the surfactant activity of the detergent affects the dispersion of SWCNT structures in solution. SDS is a strong anionic detergent that solubilizes compounds in water by virtue of coating the compounds with a layer of negatively-charged, water soluble detergent molecules. In contrast, both TX-100 and NP-40 are non-ionic detergents that function via hydrophobic interactions with the surface of a compound, thereby forming a water soluble layer of detergent molecules around the water insoluble compound. The surfactant properties (i.e. ability to decrease surface tension between aqueous and non-aqueous phases) for NP-40 are much greater than SDS and TX-100. Reported HLB values for each of these detergents are as follows (e.g., see Kagawa, *Biochim. Biophys. Acta* 265: 297–338 (1972) and Helenius et al., *Biochim. Biophys. Acta* 415: 29–79 (1975)):

| Detergent | HLB |
|---|---|
| SDS | 40 |
| TX-100 | 13.5 |
| NP-40 | 13.1 |

Three aqueous solutions were each prepared as follows. A 1 mg (total dry weight) amount of raw material was solubilized in 1 ml of double glass-distilled, deionized water (ddH$_2$O) containing one of the detergents (e.g., SDS, TX-100 or NP-40) at 50% of its respective CMC value. Each solution was subsequently vortexed for 30 minutes at room temperature. The resultant dispersions were passed through a 0.2 μm cellulose acetate filter to remove any particulate matter. Conventional spectroscopy methods were employed to measure the percent transmission (% T) of each solution at a wavelength of 450 nm (path length of 3 mm).

The % T value of each the solutions was measured to provide an indication of solution color and thus comparatively determine the ability of each detergent to effectively disperse SWCNT structures within solution. Specifically, % T values are inversely proportional to the degree of color in solution. If SWCNT structures are bundled together in a particular solution (or begin to re-aggregate into bundles), flocular material forms removing SWCNT structures from solution by sedimentation, thus decreasing the color and increasing the % T value over time. Alternatively, if SWCNT structures remain dispersed in solution, no flocking occurs and the color solution remains consistent. Therefore, a lower % T value measured in the filtrate would indicate a higher level of dispersion of SWCNT material in solution, and a constant % T over time reflects a stable SWCNT dispersion.

Figure 1B:
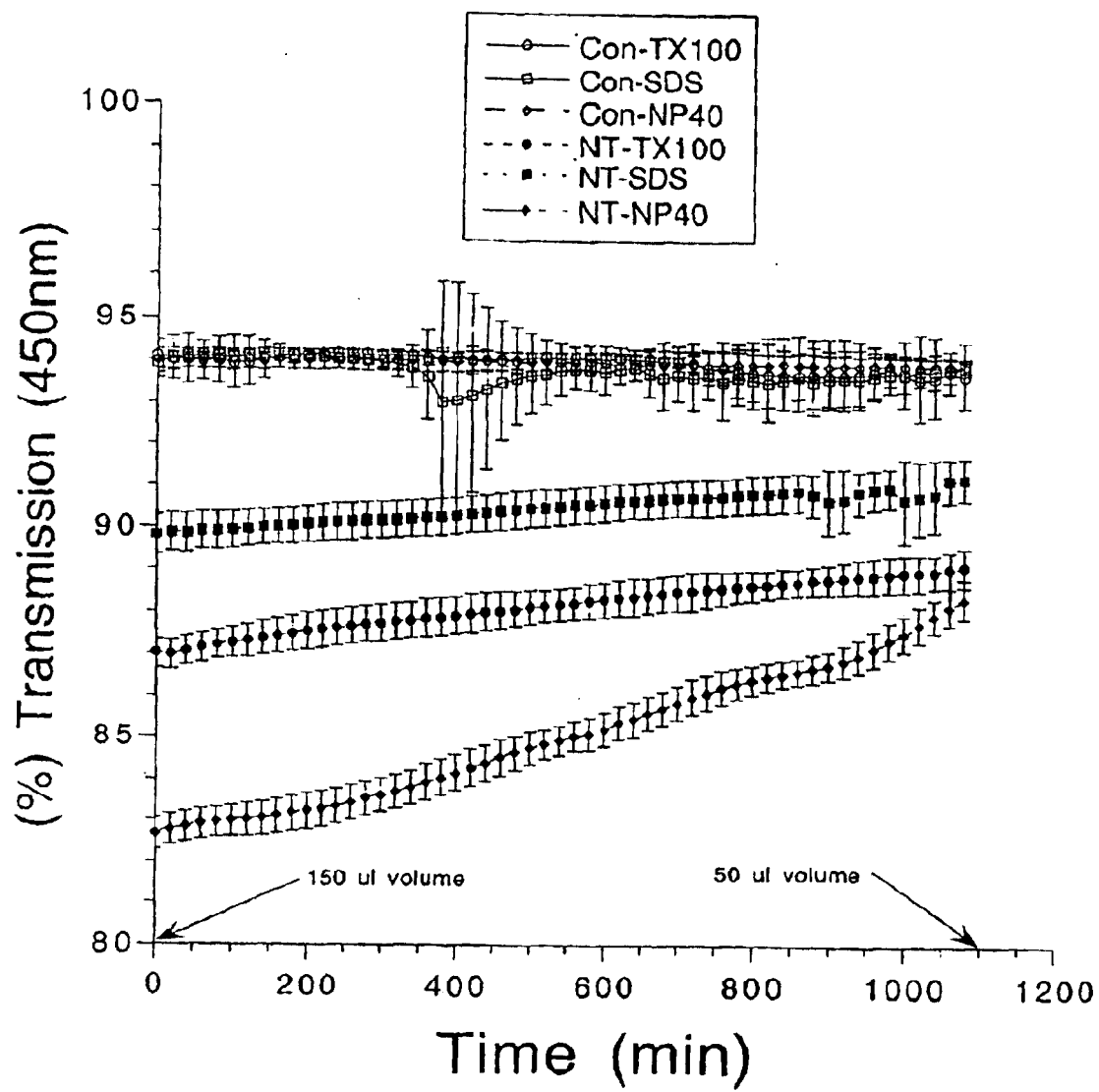
FIG. 1b is a plot of % transmission (% T) vs. time for the aqueous solutions of FIG. 2a, wherein the solutions have undergone evaporation.
Figure 1C:
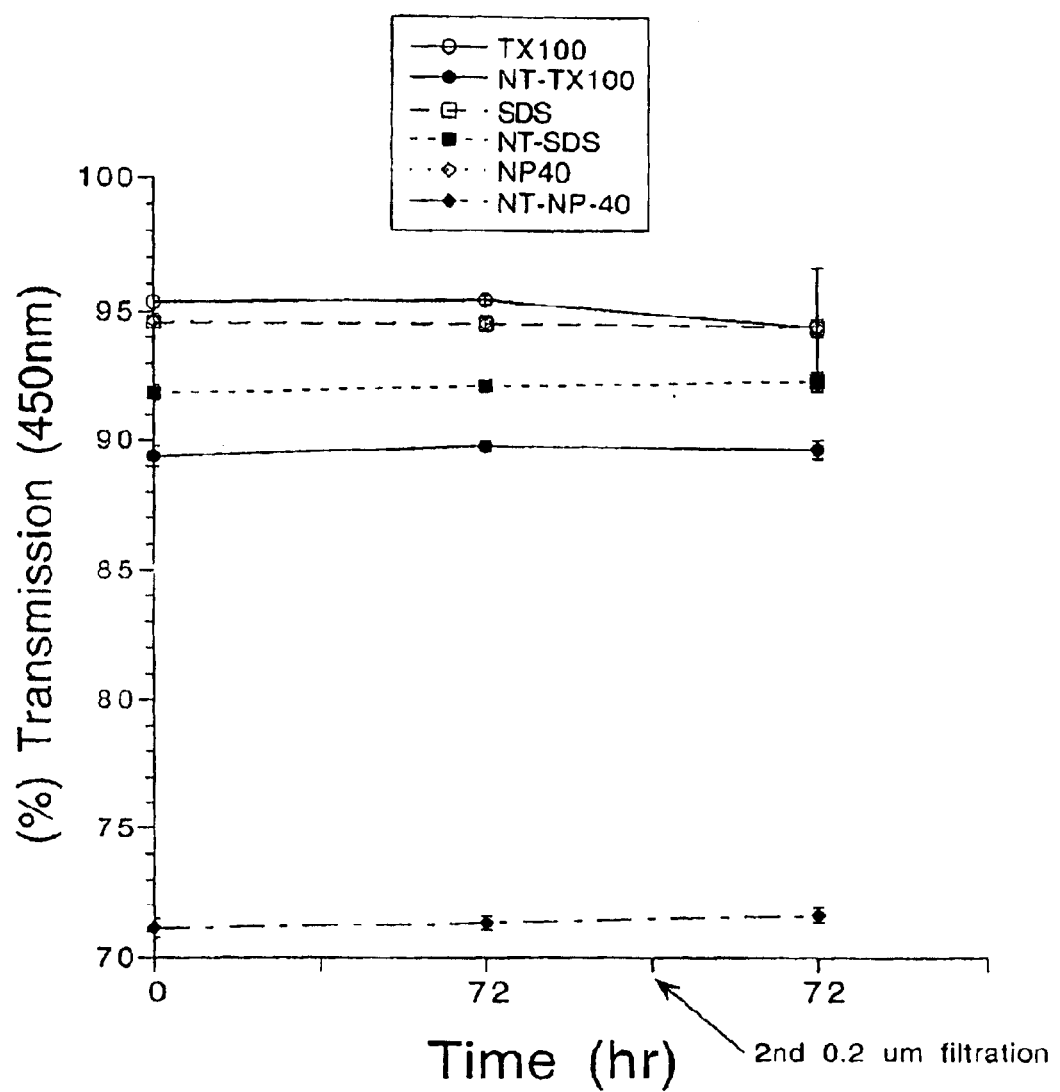
FIG. 1c is a plot of % transmission (% T) vs. time for aqueous solutions of FIG. 2a, wherein the solutions have undergone no evaporation.

The plots illustrated in FIGS. 1a–1c provide % T data for solutions containing SDS, TX-100 and NP-40, respectively, with and without SWCNT structures. The unshaded bar portions in FIG. 1a represent % T values measured for each detergent solution absent any raw material. The % T value for the shaded bar portions represent % T values measured for each detergent solution containing SWCNT structures at a time shortly after 0.2 μm filtration of the solution. The shaded bar data of FIG. 2a clearly indicates that NP-40, which has the greatest surfactant properties, has a much lower % T value than both SDS and TX-100 and thus provides a substantially more effective dispersion of SWCNT structures in aqueous solution.

To illustrate the effect of detergent concentration on SWCNT dispersion in solution, the solutions containing SWCNT structures were allowed to evaporate from an initial volume of 150 μl to a final volume of 50 μl over a period of 16 hours at room temperature. Intermittent % T measurements were taken, and the results are illustrated in FIG. 1b. The % T values for each solution containing a detergent and SWCNT structures increased with time (i.e., correlating with a decrease in color), which coincided with a noticeable appearance of flocular material in the detergent dispersions thus indicating that nanotubes were beginning to re-associate into larger bundles that were insoluble in water. The test results indicate that, as the detergent concentration increases above its CMC value, micelle formations occur in solution resulting in reduced dispersion of the SWCNT structures. Thus, selection of detergent concentration is very important in maintaining dispersion of the SWCNT structures in solution. Alternatively, the results (FIG. 1b) could indicate that as the volume of the solution decreased due to water evaporation, not only did the relative concentration of the detergent increase above its CMC resulting in a functional decrease in the amount of dispersal agent available to maintain discrete individual SWCNT's in solution, but so too did the relative concentration of the SWCNT's in the solution. Due to the colloidal nature of the SWCNT dispersion, this process could in isolation, or, in conjunction with the detergent concentration rising above the CMC, result in re-aggregation or "flocking" of SWCNT's in the dispersion, an event that in turn is reflected by an increase in % T.

A further test was conducted with solutions prepared in a substantially similar manner as the previous solutions. However, these solutions were stored in sealed vials at room temperature so as to prevent their evaporation. As indicated by the data depicted in FIG. 1c, there was relatively no change in % T value for each of the different detergent solutions and no noticeable appearance of flocular material after a 72 hour period, or an increase in % T after a second round of filtration through a 0.2 $\mu$m filler.

The data of example 1 indicates that a strong surfactant such as NP-40 is highly effective in dispersing SWCNT structures in aqueous solutions when utilized in an effective amount. Further, NP-40 can maintain a suitable dispersion of the structures in solution for extended periods of time. Weaker surfactants having HLB values greater than 13.2, such as SDS and TX-100, may provide some dispersion but will not be effective in substantially isolating and purifying SWCNT structures from raw material.

EXAMPLE 2

Aqueous solutions of each of the TA, Poloxamer 188, saponin and M$\beta$C were prepared alone and with raw material as follows. Specifically, each solution was prepared by solubilizing 1 mg of the raw material in 1 ml of ddH$_2$O containing either 50 mg/ml of TA, 50 mg/ml of M$\beta$C, 10 mg/ml of saponin or 2% (v/v) Poloxamer 188. Each resultant solution was vortexed for 30 minutes at room temperature and then filtered through a 0.2 $\mu$m cellulose acetate filter. The % T values were measured for the filtrates at room temperature immediately after filtration, 72 hr after storage in a sealed vial of the original filtered solutions and again immediately after a second filtration of the stored solutions. Dispersal agent/SWCNT-containing solutions were compared to aqueous solutions containing dispersal agent alone treated in an identical fashion.

Figure 2:
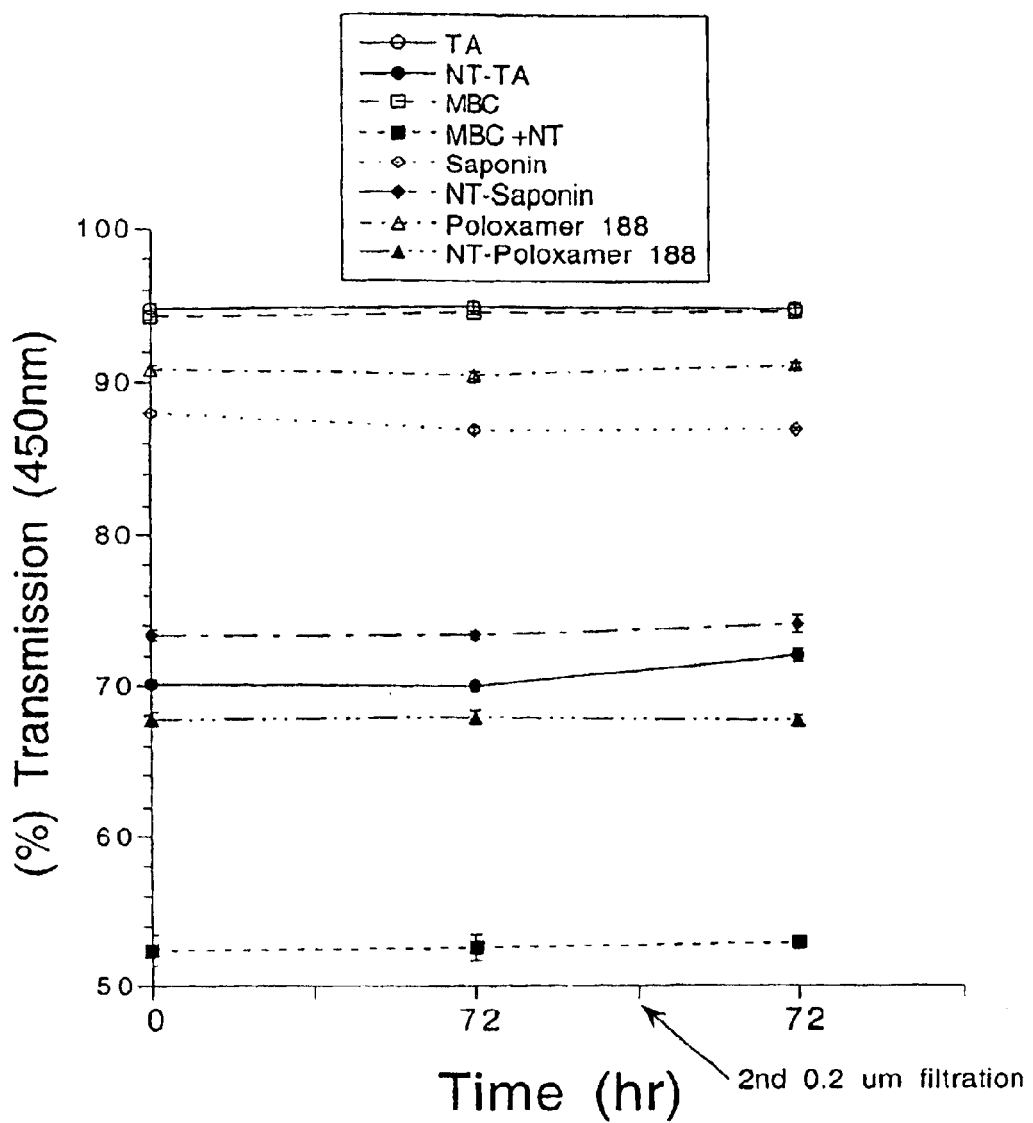
FIG. 2 is a plot of % transmission (% T) vs. time for aqueous solutions containing taurocholic acid, Poloxamer 188, saponin and methyl-$\beta$-cyclodextrin.
Figure 3:
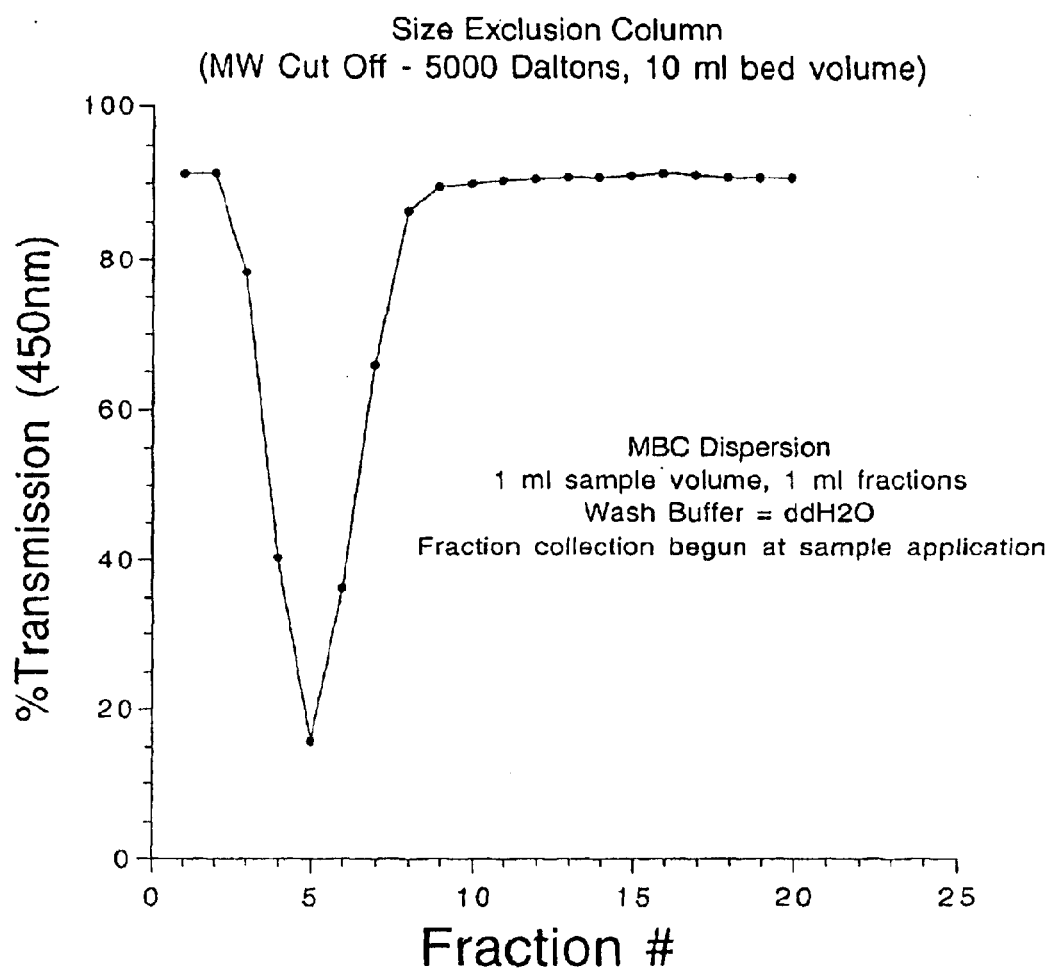
FIG. 3 is a plot of % Transmission values vs. fraction #'s measured during fractionation of methyl-$\beta$-cyclodextrin dispersed SWCNT structures in a 5000 MW size exclusion column.

The % T values illustrated in FIG. 2 reveals that the SWCNT structures remained dispersed in the TA, Poloxamer 188, saponin and M$\beta$C filtrates for the entire 72 hour period, as is evident from the relatively constant % T values measured for each filtrate over that time period. As demonstrated in FIG. 1b, if flocking or re-aggregation of dispersed SWCNT material occurs, this results in a decrease in the % T of the dispersion. In addition, if flocking or re-aggregation of SWCNT material in the dispersion (FIG. 2) had occurred to any extent during the 72 hour period of storage without water evaporation, filtration of this dispersion through a 0.2 $\mu$m filter for a second time will result in the removal of this re-aggregated or flocked material resulting in a decrease in % T value of the dispersion. The data further indicates M$\beta$C filtrates had considerably lower % T values, correlating to a greater dispersion of SWCNT structures, than either the TA, the Poloxamer 188, or saponin filtrates and the NP-40 filtrate of FIG. 2*c*. No significant increases in % T values were observed even after a second round of 0.2 μm filtration of each filtrate after the 72 hour period. The results provided in FIG. 2 clearly indicate that TA, saponin, Poloxamer 188 and MβC serve as highly effective dispersal agents, providing substantial dispersion of the SWCNT structures in aqueous solution for extended periods of time.

EXAMPLE 3

SWCNT structures dispersed in the TA and MβC solutions of the previous example were separated from the impurities in solution by centrifugation. Specifically, SWCNT structures sedimented out of a 1 ml volume of either solution having a liquid column height of 2.5 cm at a centrifugation speed of 10,000×g. In addition, sub-populations of SWCNT's dispersed in either NP-40, TA, MβC, saponin or Poloxamer 188 can be collected from the same sample by using sequentially increasing centrifugation speeds (e.g. 1,000×g, 2,500×g, 5,000×g and 7,500×g). As such, these results suggest that as is the case in biological separations where differential centrifugation can be used to separate cellular structures based upon their size (e.g., see *Techniques Reviewed in Subcellular Fractionation—A practical approach*; edited by J. M. Graham and D. Rickwood, IRL Press, Oxford, 1996), a similar approach can be utilized to collect SWCNT's of different sizes from the aqueous dispersions described here. It is noted that prior SWCNT purification techniques typically require centrifugation speeds in excess of 100,000×g to yield any sedimentation of SWCNT structures, an experimental observation that is consistent with the presence of very short (i.e., less than about 250 nm) SWCNT's being present in such previous solutions. The ability to sediment SWCNT's from the aqueous dispersions described in the present invention at the relatively low g-forces indicated above (i.e., below 10,000×g) indicates that the SWCNT structures present in those dispersions must be much larger (i.e., longer as the diameter of a SWCNT is a constant dimension of approximately 1 nm) than those previously produced and that require above 10,000×g forces to bring about sedimentation.

EXAMPLE 4

Aqueous MβC solutions containing dispersed SWCNT structures were prepared as follows. Two hundred μg of SWCNT containing raw material was solubilized in a 1 ml solution of $ddH_2O$ containing 50 mg/ml of MβC. The solution was physically homogenized in a miniaturized inversion blender at about 23,000 RPM. The resultant dispersion was subsequently vortexed for 30 minutes at room temperature followed by 100×g centrifugation for 10 minutes to sediment any remaining insoluble material. The resultant supernatant was then passed through a 5000 MW cut-off gravity-fed size exclusion column (10 ml bed volume) in the following manner. One ml of the dispersed solution was placed on the top of the column, which had been conditioned with 50 ml of $ddH_2O$. One ml fractions were then collected from the base of the column as $ddH_2O$ was added to the top of the column. The % T values were measured for each collected fraction. A plot of the % T values vs. fraction# is illustrated in FIG. 3. Colored fractions, as indicated by the decreasing % T values, were indicative of dispersions in solution. Those colored fractions (i.e., fraction#'s 1–10 of FIG. 5) were collected and pooled together. This procedure was conducted to remove excess MβC from the SWCNT dispersions. The resultant solution containing the dispersed SWCNT structures was centrifuged at 10,000×g to sediment SWCNT structures from solution.

The supernatant was then discarded and the sedimented SWCNT's were resuspended in distilled water to form a stable aqueous dispersion of discrete separated SWCNT's containing little or no excess of dispersal agent. Again, an approach that has commonly been used in biological science to achieve separation of biological molecules, namely size exclusion chromatography, can be successfully applied to the experimental problems encountered in the separation and purification of SWCNT material. Based upon an understanding of biological separation techniques, the elution of different amounts of dispersed SWCNT's from a size exclusion column after different retention times (as indicated by differing % T values in each of the fractions, i.e., Fraction #1–10, in FIG. 3) suggests that discrete SWCNT's truly dispersed in an aqueous solution can be separated and purified on the basis of their length using size exclusion chromatography in a similar fashion to that employed for separating and purifying proteins of different sizes. In conjunction with the previous Examples 1–3, these data strongly suggest that the approach described in the present invention to solving the experimental problems encountered in the separation and purification of SWCNT material, based upon the novel and innovative concept that the SWCNT structures behave essentially as "biological" compounds, rather than as a product of physical or organic chemistry, has been successful.

Having described novel methods of producing stable aqueous dispersions of SWCNT's and corresponding products thereof, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed:

1. A method of isolating single walled carbon nanotube structures, the method comprising:

mixing said structures in a solution including an effective amount of a dispersal agent to substantially disperse said structures within said solution;

wherein said dispersal agent comprises at least one of octyl-phenoxypolyethoxyethanol, polyoxyethylene sorbitol esters, deoxycholates, taurocholic acid, cyclodextrins, chaotropic salts, poloxamers, and sapogenin glycosides.

2. The method of claim 1, wherein mixing said structures in said solution substantially separates said structures from contaminants in said raw material.

3. The method of claim 1, wherein said dispersal agent comprises at least one of cyclodextrins, saponin and taurocholic acid.

4. The method of claim 3, wherein said effective amount of said dispersal agent is no greater than about 500 mg/ml.

5. The method of claim 3, wherein said effective amount of said dispersal agent is at least about 5 mg/ml.

6. The method of claim 1, wherein said dispersal agent comprises a cyclodextrin derivative selected from the group consisting of methyl-β-cyclodextrin and 2-hydroxypropyl-β-cyclodextrin.

7. The method of claim 1, wherein said dispersal agent comprises a chaotropic salt selected from the group consisting of urea and guanidine.

8. The method of claim 7, wherein the effective amount of said chaotropic salt in said solution is in no greater than about 9M.

9. The method of claim 7, wherein the effective amount of said chaotropic salt in said solution is at least about 6 M.

10. The method of claim 1, further comprising: separating said structures from said raw material in said solution by at least one of:

passing said solution through a filter to form a purified filtrate of said structures; and passing said solution through a size exclusion column to form a purified solution of said structures.

11. The method of claim 10, wherein said filter includes a pore size no greater than about 0.20 μm.

12. The method of claim 1, further comprising:

centrifuging said solution at a speed in a range no greater than about 10,000×g to sediment said structures in said solution;

removing said structures from said solution; and mixing said structures in a second solution to substantially disperse said structures in said second solution, wherein said second solution is substantially free of said dispersal agent prior to mixing with said structures.

13. A method of purifying single walled carbon nanotube structures embedded within raw material, the method comprising:

mixing said structures in a solution including an effective amount of a dispersal agent to substantially separate said structures from contaminants in said raw material;

wherein said dispersal agent comprises at least one of octyl-phenoxypolyethoxyethanol, polyoxyethylene sorbitol esters, deoxycholates, taurocholic acid, cyclodextrins, chaotropic salts, poloxamers, and sapogenin glycosides.

* * * * *